June 5, 1962 W. F. MUELLER 3,038,115
ORIENTATION OF NUCLEAR MAGNETIC RESONANCE SAMPLES
Filed Feb. 11, 1957 2 Sheets-Sheet 1
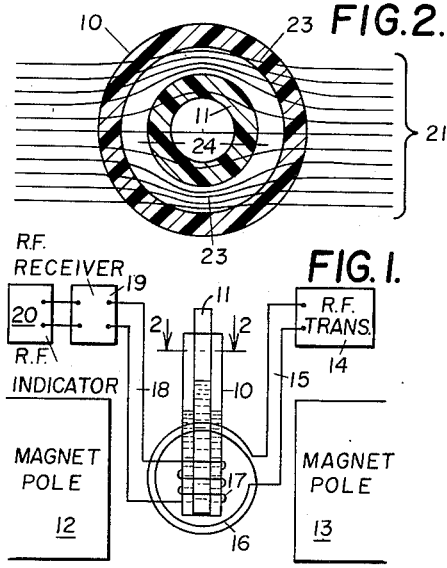
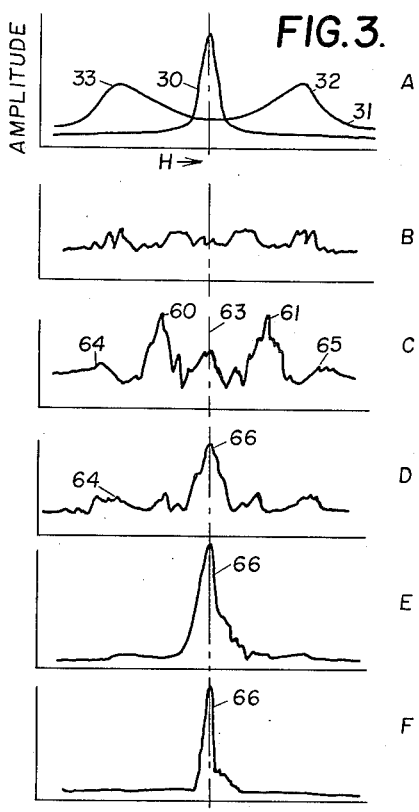
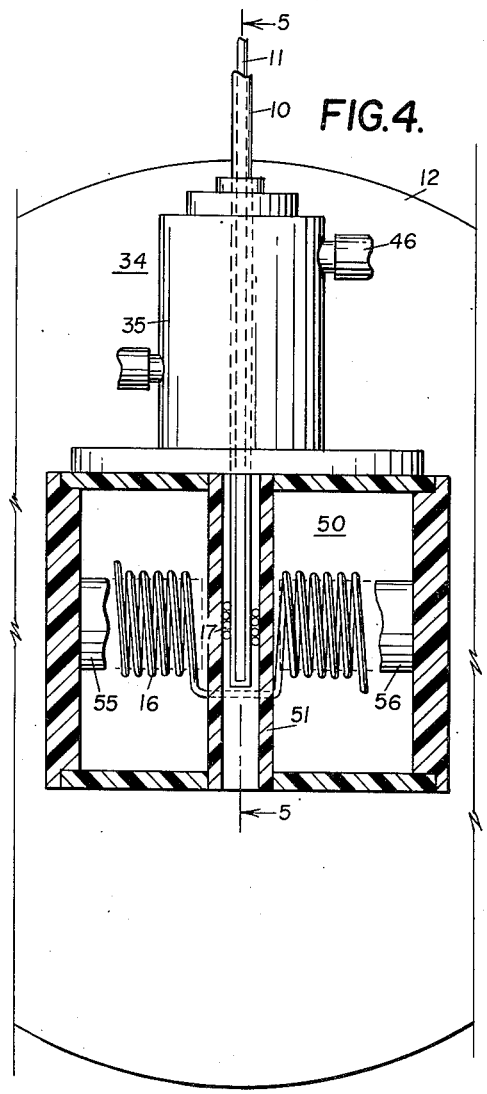
WILLIAM F. MUELLER
INVENTOR
BY D. Carl Richards
ATTORNEY June 5, 1962 W. F. MUELLER 3,038,115
ORIENTATION OF NUCLEAR MAGNETIC RESONANCE SAMPLES
Filed Feb. 11, 1957 2 Sheets-Sheet 2

WILLIAM F. MUELLER
INVENTOR.

BY D. Carl Richards
ATTORNEY

# United States Patent Office 3,038,115
Patented June 5, 1962

3,038,115
ORIENTATION OF NUCLEAR MAGNETIC
RESONANCE SAMPLES
William F. Mueller, Dallas, Tex., assignor, by mesne assignments, to Socony Mobil Oil Company, Inc., New York, N.Y., a corporation of New York
Filed Feb. 11, 1957, Ser. No. 639,415
10 Claims. (Cl. 324—.5)

This invention relates to measurements of nuclear resonances in a polarizing magnetic field controllably distorted and more particularly to a sample orienting system.

It has been discovered, as disclosed in Patent No. 2,561,489 to Bloch et al., that magnetic moments of nuclei in normal matter will result in a nuclear paramagnetic polarization upon the establishment of equilibrium in a constant magnetic field and that application of a radio frequency field at right angles to the constant field causes a forced precession of the total polarization relative to the direction of the constant field as the Lormor frequency approaches adiabatically the frequency of the radio frequency field. As a result, components of nuclear polarization appear at right angles to both the constant field and the radio frequency field and the resultant component is utilized to induce observable signals or voltages which are representative of variations in the resonance of the matter under test.

In U.S. application Serial No. 488,070, filed February 14, 1955, now abandoned, for Nuclear Magnetic Resonance in Thin Flms by John R. Zimmerman, Jr. and Irving Weinberg, co-workers of applicant, there is described a method and apparatus for investigating the nuclear magnetic resonance properties of a substance disposed in the form of a thin-walled cylindrical film having its axis at right angles to the direction of the polarizing magnetic field. There is further disclosed and claimed ni the aforesaid application the method which involves rotating such a sample about its axis of symmetry to produce a sharp resonance or standard reference line in the nuclear magnetic resonance spectrum. By rotating the cylindrically disposed chamber, the standard conveniently may be employed in connection with simultaneous studies of the nuclear resonance character of unknown substances with both the standard and the unknown substance located as nearly as possible in the same magnetic environment. In accordance with the present invention, there is provided a system for orienting such a thin-walled cylindrical film or sample in a magnetic field without substantially disturbing the magnetic field outside the sample.

In a more specific aspect, there is provided a sample spinning unit of non-magnetic materials including a cylindrical sample holder having an enlarged central section extending over a limited fraction of the length thereof with one end of the enlarged section provided with air scoops. A housing having a cylindrical opening forming a chamber therein is provided to receive said holder and support said section with said air scoops adjacent the bottom thereof. Means are provided for directing a driving fluid into the air scoops to rotate the holder and to form an axial fluid bearing therefor. Point contact bearings are then provided for the holder spaced axially above and below the enlarged section with the holder extending substantially below the lower of the contact bearings. Test materials in the holder may thus be conveniently rotated in the test zone without production of distortion in the environment of measurement by the presence of the orienting system.

For a further understanding of the present invention and for a more complete description thereof, reference may now be had to the following description taken in conjunction with the accompanying drawings in which:

FIG. 1 is a diagrammatic sketch of a high resolution nuclear magnetic resonance system;

FIG. 2 is an enlarged cross-sectional view of the sample holder of FIG. 1;

FIG. 3 illustrates resonances obtained with the system of FIGS. 1 and 2;

FIG. 4 is a sectional view of a portion of the system of FIG. 1;

Figure 5:
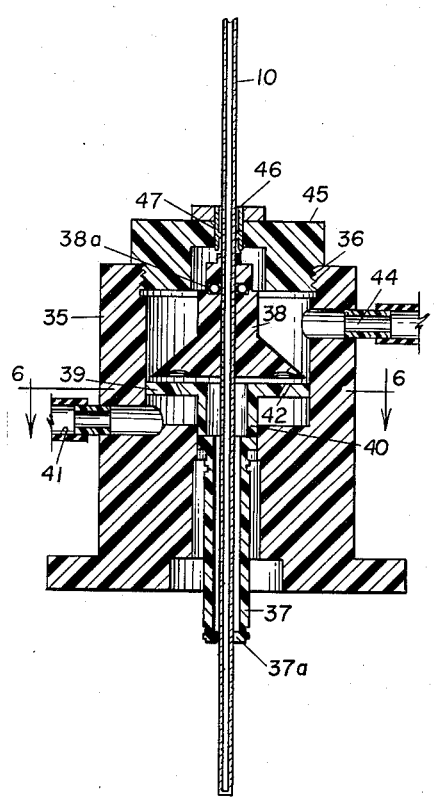
FIG. 5 is a sectional view of FIG. 4 taken along line 5—5 thereof with certain parts of the system disclosed in FIG. 4 omitted.

In FIG. 1 coaxially disposed glass tubes 10 and 11 are positioned in a uniform unidirectional magnetic field produced by a magnetic system represented by magnet poles 12 and 13. An R.F. transmitter 14 connected by channel 15 to a coil 16 is employed to apply to the material in test tubes 10 and/or 11 a radio frequency field oriented at right angles to the unidirectional field between poles 12 and 13. A detecting coil 17 is connected by way of channel 18 to an R.F. receiver 19 and thence to an R.F. receiver 20.

In high resolution nuclear magnetic resonance systems the radio frequency field established by coil 16 is maintained at a constant frequency and amplitude. The polarizing magnetic field in the gap between poles 12 and 13 is then slowly varied over a range such that a substance placed in a test tube is subjected to a range of magnetic fields to drive the substance through a nuclear resonance. An electromagnetic field having a component perpendicular to both the polarizing magnetic field and the field from coil 16 induces a voltage in coil 17, which voltage is then displayed or otherwise measured or preserved on the R.F. indicator 20.

The present invention relates to a sample spinner for a high resolution system in which a substance to be tested is disposed in cylindrical form in the polarizing magnetic field, preferably in the form of a relatively thin film or cylinder. For example as shown in FIG. 1, the material in the annulus between tubes 10 and 11 is one form particularly desirable for use in the present invention. This configuration may best be seen where tubes 10 and 11 have been greatly enlarged and illustrated in the cross-sectional view of FIG. 2.

The polarizing magnetic field represented by flux lines 21, FIG. 2, is uniform outside tubes 10 and 11. However, assuming that the material in the annulus between tubes 10 and 11 has a higher magnetic susceptibility than the glass itself, a distortion of the magnetic field is produced. As shown, there is a concentration of flux lines in regions 23 because of the lower magnetic reluctance in the flux path in the direction of the magnetic field afforded by portions of the annulus. Conversely in regions 24 there is a "rarefaction" of the magnetic field. Thus the material in the annulus in regions 23 is in a much higher magnetic field than in regions 24. Nuclei in the region 23 of the thin cylindrical shell, when subjected to an R.F. field as from transmitter 14, channel 15 and coil 16, FIG. 1, will resonate at a higher frequency than those in regions 24 because of the different magnetic fields in the immediate vicinity of the nuclei.

To illustrate this effect there is plotted in FIG. 3, graph A, a high resolution spectrum obtained in a system of FIG. 1 modified by removing the inner test tube 11 and filling the entire volume of test tube 10 with water. The amplitude of the voltage induced in coil 17 is plotted along the ordinate and magnetic field strength is plotted along the abscissa. The bulk resonance for water is characterized by a curve 30 which has a single predominant peak.

If the system is altered by inserting tube 11 into tube 10 thereby displacing a major portion of the water and forcing the water remaining to form a thin cylindrical shell, the resonance phenomenon is represented by the curve 31. This curve is characterized by two peaks 32 and 33 displaced on opposite sides of peak 30. Peaks 32 and 33 may be taken as representative of proton resonance in the highest magnetic field as in zone 23, FIG. 2, and the resonance in the lowest magnetic field such as in regions 24, FIG. 2, respectively. Transitions between the high and low magnetic fields are represented by the region between peaks 32 and 33.

It has further been found that materials in the annulus between tubes 10 and 11 having different susceptibilities cause differences in the spacing between peaks 32 and 33. Such differences are readily interpretable in terms of the magnetic susceptibility of the material in the annulus.

It has further been found that if a known substance is placed in the annulus and from which there may be produced a resonance of the type shown on curve 31, FIG. 3, further steps may be followed to produce a single resonance peak extremely sharp in character which may then be employed as a standard or calibrating point in the resonance spectrum for unknown samples. This is particularly advantageous because the reference material and an unknown sample will be positioned as nearly as is possible in a common magnetic environment. The unique geometry of the system permits such orientation of the materials to be tested and also the simultaneous production of a calibration curve from a known substance and a resonance curve from an unknown substance. A known sample placed in the annulus and an unknown inside tube 11, rotated together at high speeds about the longitudinal axis of the tubes 10 and 11, produce desired observable resonance signals.

The present invention relates to a system for so orienting a sample. Such a system is illustrated in FIG. 4, slightly enlarged FIG. 5 and in FIGS. 6, 7 and 8 where, for convenience, like parts will be given the same reference characters. Tubes 10 and 11, FIG. 4, or the single tube 10, FIG. 5, are mounted in an air turbine 34, FIG. 4, preferably formed entirely of non-magnetic plastic material. The turbine includes a cylindrical housing 35 having a threaded upper portion 36 on the interior of a doubly re-entrant opening or well which extends therethrough. A bearing support and guide member 37 may be secured inside housing 35 and extends below housing 35. A central channel through the member 37 accommodates the sample cells or tubes.

A hollow rotor 38 is positioned inside a rotor chamber formed by the larger of the re-entrant openings in the housing 35. The rotor chamber has a planar bottom surface broken by the smaller diameter channel in axial alignment with the chamber. The rotor 38 preferably is provided with O-rings such as the O-ring 38a, FIG. 5, encircling the center bore frictionally to engage the surface of the tube 10 to form the unitary rotor structure shown in FIG. 7. One O-ring near the top of the rotor 38, and in instances a second O-ring near the bottom, have been employed to provide a readily engageable, resilient frictional coupling between tube 10 and rotor 38.

Figure 6:
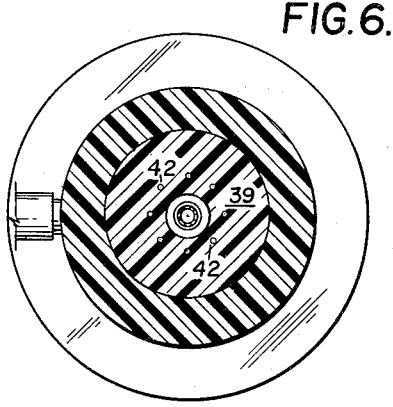
FIG. 6 is a sectional view of FIG. 5 taken along the line 6—6 thereof.
Figure 7:
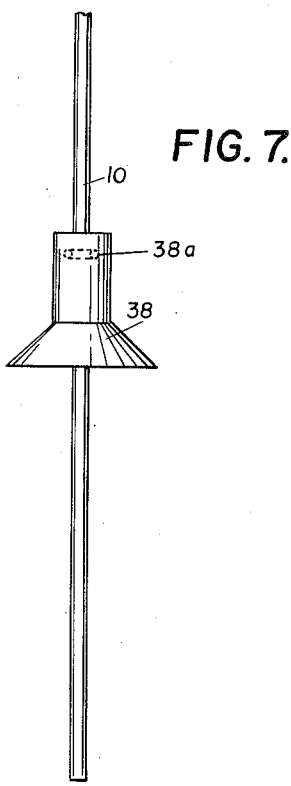
FIG. 7 is a side view of the rotor and a sample cell.
Figure 8:
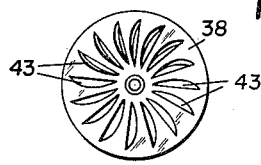
FIG. 8 is a bottom view of the rotor.

A bulkhead 39 is positioned near the lower portion of the larger chamber of housing 35 having a shaft 40 which extends into and closes the smaller aperture in the lower portion of housing 35. An inlet port 41 is suitably connected to a compressed air source and is adapted to deliver a driving fluid such as compressed air into the annular chamber below bulkhead 39. A plurality of small ports 42 oriented in a circular array as best seen in FIG. 6 provide a flow path from the inlet chamber of housing 35 to the rotor chamber thereof. As best seen in FIG. 8, the bottom surface of the rotor is milled or otherwise shaped to provide vanes or scoops 43 positioned in cooperative relation with respect to the ports 42. Rotor 38 is thereby adapted to be actuated by flow of air through ports 42 into the rotor chamber which is provided with an outlet port 44.

In the absence of fluid flow, the bottom face of rotor 38 rests on the upper face of bulkhead 39, both surfaces being substantially planar. Upon flow of fluid or air through inlet port 41, rotor 38 is raised slightly from contact with bulkhead 39 so that a relatively small passage exists between bulkhead 39 and the lower face of rotor 38. As the air escapes to the upper portion of the rotor chamber and out through outlet port 44, reaction with the vanes 43 produces rotation of the rotor 38 and tube 10 and also causes a slight elevation thereof, the amount of which will be dependent upon the magnitude of air flow. Thus there is provided an air cushion or bearing for rotor 38. Though not readily shown in the drawings, the ports 42 preferably are not perpendicular to the face of bulkhead 39 but are slanted or directed toward the actuating surfaces of vanes 43.

The system is maintained in axial alignment with the housing 35 by bearings, preferably contact bearings of small surface area, provided to contact the surface of tube 10. More particularly, the lower end of the guide member 37 is provided with an inwardly directed annular portion 37a which provides a bearing at the lower section of tube 10. A cap 45 threadedly engages the upper portion 36 of the housing 35 to form a closure member therefor. A closure member such as the cap 45 is provided with a bearing element 46 which is provided with an internal annular ring 47 which serves as a bearing for the upper end of tube 10.

As shown in FIG. 4, the air turbine 35 is mounted with test tubes 10 and 11 extending down into the test unit 50. The test unit 50 includes a sample well formed of a cylinder 51 in which test tubes 10 and 11 are centered. The detecting coil 17 is secured to the inner surface of cylinder 51 and is located substantially symmetrical to the axis of the R.F. field coil 16. Coil 16 is split as shown in FIG. 4 and mounted on suitable non-magnetic cylindrical extensions 55 and 56 which are secured to the ends of the test unit 50. The axes of coils 16 and 17 are mutually perpendicular to each other and to the polarizing magnetic field which extends between the magnetic poles 12 and 13, only magnetic pole 12 being shown (in part) in FIG. 4.

The utility of the system may best be understood by now considering FIG. 3. Curve 31 of graph A is representative of the nuclear resonance spectrum of water in the annulus between tubes 10 and 11 without rotation. Graphs B, C, D E and F represent transitions in curve 31 as a function of the rotational speed of the tubes 10 and 11. The shifted broadened resonance of curve 31 is fairly symmetrical with respect to the bulk water resonance of curve 30, graph A. However, the separation of peaks 31 and 32 relative to the peak of curve 30 may readily be measured as the distance along the magnetic field scale H. With increasing speeds of revolution of the tubes 10 and 11 with water in the annulus only, the effects shown in graphs B–F are observed which readily show an apparent breaking up of the pattern of graph A. This effect is apparent in graph B. As speed further increases, a pattern appears with fairly predominant peaks 60 and 61, graph C, which are symmetrical with respect to a line 63 which is equally spaced from peaks 32 and 33. Secondary peaks 64 and 65 may also be seen. Thus the peaks 32 and 33 each break up into separate resonances. However as speed further is increased, the resonances shown in graph C break up to emphasize a single resonance peak 66 symmetrical to line 63. As shown in graph D, peak 66 becomes pronounced with decreased amplitude on the flanks thereof. Graph E shows the peak 66 fairly well developed and graph F shows a final development of a sharp spike, which may be considered to be a Bessel function distribution of the resonance of nuclei in the annulus between test tubes 10 and 11.

By producing the sharp line resonance, an accurate index is thus provided for use in connection with unknown substances placed inside the inner tube 11.

Thus there is provided a means for spinning thin cylindrical films for measuring magnetic susceptibility of unknown samples for providing an accurate sharp reference point in a resonance spectrum for studies of other unknowns.

While the sample holders in the drawings are cylindrical in form, other configurations may be employed. For example, glass mandrels may be employed in place of the inner tube 11 which have shapes other than the cylindrical form which may be received by the sample spinner to controllably distort the magnetic field and modify the actual shape of the resonance produced.

While the foregoing description is related to the orientation of sample systems such as test tubes 10 and 11, it is to be understood that in practice such tubes are relatively small in diameter. In one embodiment, tube 10 was a glass capillary having a 5 millimeter outside diameter and the inner tube 11 was a glass capillary having a 3 millimeter outside diameter. Mechanical tolerance was carefully maintained requiring close tolerance on the provision of the spinning mechanism. Thus the bearing rings or annular supports 37a and 47 together with the rotor 38 were carefully machined to provide a balanced rotor system. Since the space between the capillaries then constituted nothing more than a relatively thin film of liquid, it was necessary to provide a mechanical spinner of tolerances approaching the dimensions of the latter.

In order to appreciate how the invention makes possible a high refinement in N.M.R. studies, it should be understood that in practice the film of liquid is placed in a polarizing magnetic field in the order of 9500 gauss. A radio frequency field is produced normal to the polarizing field. The radio frequency field is of the order of $40 \times 10^6$ cycles per second and of low intensity compared with the polarizing field, in the order of a milligauss. Varying the polarizing magnetic field over a range of about 20 to 40 milligauss will result in the detection of the twin peaks 32 and 33, FIG. 4, which, depending upon the dimensions of the film, were 12 to 30 milligauss apart. After obtaining the curve 31, FIG. 3, the system when rotated up to a speed of about 80 cycles per second will produce the relatively sharp peak 66 of graph F, FIG. 3.

While the foregoing measurements have been obtained using water in the annulus between capillaries, it will be readily apparent that other proton bearing compounds may be employed to secure similar resonance curves thereof. Further, solid samples may be similarly oriented as by spinning, such samples being placed in the polarizing fields in the form of thin cylindrical shells or other configurations supported in a system generally as above described.

It will be readily appreciated that the changes in the geometry of the system may serve to produce changes in the resonance signals. Uniformity of results in connection with tests and calibration procedures will depend to a degree upon the symmetry of the system relative to the axis of rotation. This might suggest the necessity of precision elements for tubes 10 and 11. However, it has been found that stock tubes often may be employed if they are first subjected to a preliminary evaluation. One method of evaluating the symmetry of a system is to place a first substance in the annulus between tubes 10 and 11 and a second substance inside tube 11. The tubes are then placed in the spinner or air turbine and rotated to produce two resonance signals, one of the character of graph F, FIG. 3, and the other the resonance of the material inside tube 11. The tubes may then be cleaned and the same substances replaced but with positions reversed so that the first material is now in tube 11 and the second material forming the annular film. Rotation of the system again will produce the two resonance curves. If the system embodies the required degree of symmetry, the spacing between the two resonance curves in terms of polarizing magnetic field intensity will be identical for both tests and the tubes are satisfactory. Asymmetry will cause deviation in the spacings between the resonance curves, indicating that the tubes may be unsatisfactory.

The foregoing description pertains to the use of a spinner system in conjunction with radio frequency signals which are maintained constant and the polarizing magnetic field is varied over a range defining a spectral scale. It will be apparent that the the polarizing magnetic field may be maintained constant and the alternating field varied in frequency to define a spectral scale. Although the spinner or turbine has been described as an air turbine, it will be readily apparent that other fluids may be employed so long as they do not materially alter the magnetic field or exhibit a nuclear resonance phenomenon which will interfere with the measurements being made. While the vanes 43, FIG. 8, have been shown as in a particular embodiment, it will be appreciated that other structures may be employed. Further, the drawings illustrate use of tubes 10 and 11 as having flat ends. Round tubes may in some cases be employed although the former are preferred since centrifugal forces in round-ended tubes tend to force liquid samples toward the top of the tubes.

Having described the invention in connection with certain modifications thereof, it will now be understood that further modifications may now suggest themselves to those skilled in the art and it is intended to cover such modifications as fall within the scope of the appended claims.

What is claimed is:

1. A unit for spinning a sample in a test zone which comprises non-magnetic materials forming each of a rotor of conical configuration having an axial aperture and air scoops in the base thereof symmetrically disposed with reference to said aperture, a cylindrical sample holder adapted to be received in said aperture and to form a unitary structure by frictional engagement therewith and of length substantially greater than that of said rotor, a housing adapted to be supported above said test zone having a doubly re-entrant opening extending therethrough, the larger portion thereof having a diameter slightly greater than the base of said rotor to form a chamber to receive said rotor and to support the base thereof with said air scoops adjacent the shoulder of said re-entrant opening, means adapted to direct a driving fluid into said air scoops to rotate said holder and form an axial air cushion therefor, and point contact bearings for said holder, one above said rotor and one intermediate said rotor and said test zone.

2. A system for testing an elongated sample adapted to be supported in a cylindrical holder in a nuclear magnetic resonance system which comprises non-magnetic materials forming each of a housing with a doubly re-entrant cylindrical opening extending therethrough to form a rotor chamber in the upper portion thereof, a conically-shaped rotor positioned in said chamber with the bottom thereof provided with air scoops adjacent the shoulder of said re-entrant opening and having a cylindrical center bore adapted frictionally to receive and support said holder, means for injecting a driving fluid into said chamber and said air scoops to drive said rotor, and contact bearings of diameter corresponding to the diameter of said holder displaced axially of said rotor above and below said chamber.

3. A system for testing an elongated sample adapted to be supported in a cylindrical holder in a nuclear magnetic resonance system which comprises non-magnetic materials forming each of a housing with a doubly re-entrant cylindrical opening extending therethrough to form a rotor chamber in the upper portion thereof, a conically-shaped rotor positioned in said chamber with the bottom thereof provided with air scoops adjacent the shoulder of said re-entrant opening and having a cylindrical center bore adapted to receive and to be secured to said holder, means for injecting a driving fluid into said chamber and said air scoops to drive said rotor, and contact bearings of diameter corresponding to the diameter of said holder displaced axially of said rotor above and below said chamber.

4. A system for testing a sample adapted to be supported in a cylindrical holder in a nuclear magnetic resonance system which comprises a non-magnetic spinning structure having a housing with a cylindrical opening therein to form a rotor chamber having a substantially planar bottom, a rotor positioned in said rotor chamber adapted at the axis thereof to receive and frictionally to engage said holder and having a plurality of air scoops in the bottom surface thereof, means adapted to direct a driving fluid through the bottom of said rotor chamber onto said air scoops to rotate said rotor and said holder, and bearing contacts of diameter corresponding to the diameter of said holder displaced axially of said rotor above and below said chamber.

5. In a system for testing a sample adapted to be supported in a holder in a nuclear magnetic resonance system which comprises a non-magnetic spinning structure having a housing with a doubly re-entrant cylindrical opening extending therethrough to form a rotor chamber which chamber has a substantially planar bottom surface, a rotor positioned in said rotor chamber adapted at the axis thereof to receive and to engage said holder and having a plurality of air scoops in the bottom surface thereof, means adapted to direct a driving fluid through the bottom of said rotor chamber onto said air scoops to rotate said rotor and said holder, an outlet port extending from said upper chamber above said rotor, and bearing contacts of diameter corresponding to the diameter of said holder displaced axially of said rotor above and below said chamber.

6. A system for testing a sample adapted to be supported in a cylindrical holder in a nuclear magnetic resonance test zone which comprises non-magnetic materials forming a housing with a cylindrical chamber therein adapted to be supported above said test zone with a channel extending from the bottom of said chamber and with a plurality of fluid inlet ports in the bottom thereof symmetrically positioned about the axis thereof, a conically-shaped rotor positioned in said chamber with air scoops in the bottom thereof and having a cylindrical center bore adapted to receive and be secured to said holder, means for driving a fluid through said inlet ports to impel said rotor, means extending below said chamber for contacting said holder between said housing and said test zone, and a closure member for said housing provided with an aperture to receive said holder and to provide a contact bearing therefor above said chamber.

7. A system for testing a sample adapted to be supported in a cylindrical holder in a nuclear magnetic resonance test zone which comprises non-magnetic materials forming a housing with a cylindrical chamber therein adapted to be supported above said test zone with a channel extending from the bottom of said chamber, a bulkhead in said chamber having a flat upper surface and forming an inlet chamber therebelow with flow ports extending therethrough disposed symmetrically about the axis of said chamber, a conically-shaped rotor positioned in said chamber with air scoops in the bottom thereof registering with said ports and having a cylindrical center bore adapted to receive and be secured to said holder, means for driving a fluid through said ports to impel said rotor, bearing means providing an aperture of diameter corresponding to that of said holder and positioned below said chamber and along the axis thereof, and a closure member for said housing provided with an aperture of diameter corresponding to that of said holder to provide a contact bearing therefor above said chamber.

8. A system for testing a sample adapted to be supported in a cylindrical holder in a nuclear magnetic resonance system which comprises a non-magnetic spinning structure having a housing with a cylindrical opening therein to form a rotor chamber, a rotor positioned in said rotor chamber having a central channel therein and air scoops in the lower surface thereof, resilient means mounted in said rotor and extending into said channel to receive and frictionally to engage said holder, means adapted to direct a driving fluid through the bottom of said rotor chamber onto said air scoops to rotate said rotor and said holder, and bearing contacts of diameter corresponding to the diameter of said holder displaced axially of said rotor above and below said chamber.

9. The combination of claim 8 in which said resilient means comprises O-ring means mounted in the wall forming said central channel.

10. The combination of claim 8 in which said resilient means comprises O-rings mounted in the wall forming said central channel.

References Cited in the file of this patent

UNITED STATES PATENTS

| | | |
|---|---|---|
| 2,864,995 | Shoolery | Dec. 16, 1958 |
| 2,960,649 | Bloch | Nov. 15, 1960 |

FOREIGN PATENTS

| | | |
|---|---|---|
| 1,126,251 | France | July 23, 1956 |

OTHER REFERENCES

Shoolery: Review of Scientific Instruments, vol. 28, No. 1, January 1957, pp. 61, 62.

Arnold: Physical Review, vol. 102, No. 1, April 1, 1956, pp. 136–167.

Anderson et al.: Physical Review, vol. 94, No. 2, April 15, 1954, pp. 497–498.

Beams: Journal of Applied Physics, vol. 8, No. 12, pp. 795–806, December 1937.